(12) United States Patent
Asada et al.

(10) Patent No.: US 7,504,784 B2
(45) Date of Patent: Mar. 17, 2009

(54) MOTOR DRIVING APPARATUS OF WASHING AND DRYING MACHINE

(75) Inventors: Kazuhiko Asada, Osaka (JP); Mitsuyuki Kiuchi, Nara (JP); Hisachi Hagiwara, Osaka (JP); Hiroyuki Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 11/616,487

(22) Filed: Dec. 27, 2006

(65) Prior Publication Data

US 2007/0145941 A1    Jun. 28, 2007

(30) Foreign Application Priority Data

Dec. 27, 2005   (JP)   ............................. 2005-374426

(51) Int. Cl.
  *H02P 27/08*   (2006.01)
  *H02P 5/74*    (2006.01)
  *D06F 58/28*   (2006.01)

(52) U.S. Cl. .................. 318/51; 318/400.02; 318/433; 318/722; 34/499

(58) Field of Classification Search .................. 318/34, 318/51, 53, 85, 430–434, 700, 400.01, 400.02, 318/400.07, 400.17, 400.26, 400.3, 400.32, 318/720–724; 34/493, 497, 499

See application file for complete search history.

(56) References Cited

U.S. PATENT DOCUMENTS

| 3,702,030 | A | * | 11/1972 | Janke | ........................ 34/498 |
| 3,909,955 | A | * | 10/1975 | Janke | ........................ 34/531 |
| 5,564,831 | A | * | 10/1996 | Bashark | ..................... 374/141 |
| 6,745,495 | B1 | * | 6/2004 | Riddle et al. | .................. 34/497 |
| 7,216,514 | B2 | * | 5/2007 | Sakita et al. | ............... 68/12.12 |

FOREIGN PATENT DOCUMENTS

JP    2005-198933    7/2005

* cited by examiner

*Primary Examiner*—Bentsu Ro
(74) *Attorney, Agent, or Firm*—RatnerPrestia

(57) ABSTRACT

With the use of three inverter circuits controlled by a single processor, the controller of the motor-driving apparatus provides a rotation drum-driving motor, a compressor-driving motor and a blow fan-driving motor with a simultaneous sinusoidal-wave control. The configuration above offers stable sinusoidal-wave drive, reducing vibration noise of the rotation drum, the compressor and the blow fan.

10 Claims, 10 Drawing Sheets

MOTOR DRIVING APPARATUS OF WASHING AND DRYING MACHINE

FIELD OF THE INVENTION

The present invention relates to a motor-driving apparatus of a washing and drying machine that drives a plurality of motors at the same time with the use of a plurality of inverter circuits.

BACKGROUND ART

Conventionally, such a motor-driving apparatus of a washing and drying machine has a plurality of inverter circuits that drives a plurality of motors so that a rotation drum, a compressor and a blow fan are driven by each pair of an inverter circuit and a motor. For example, such a washing and drying machine is disclosed in Japanese Patent Unexamined Publication No. 2005-198933.

However, a conventional motor-driving apparatus of a washing and drying machine has following problems. Adopting an inverter circuit that drives a motor with rectangular waves of 120° makes loud vibration noise. Similarly, adopting an inverter circuit that drives a motor with sinusoidal waves, due to differences in revolution speed of each motor, carrier frequencies and processors (although a description on the in-detail configuration is not given), the sinusoidal-wave control is interfered by power switching noise. As a result, the aforementioned configuration has difficulty in obtaining a stable driving in a practical use.

SUMMARY OF THE INVENTION

The motor-driving apparatus of a washing and drying machine of the present invention includes a rectifying circuit for converting AC (alternating current) power of AC power supply into DC (direct current) power; a plurality of inverter circuits for converting DC power from the rectifying circuit into AC power; a first motor for driving a rotation drum; a second motor for driving a compressor of a heat pump; a third motor for driving a blow fan that sends air to a heat exchanger of the heat pump; and a controller that controls the inverter circuits by a single processor. The controller has a configuration where the first through third motors are simultaneously driven by sinusoidal-wave control of each of the inverter circuits.

DETAILED DESCRIPTION OF THE INVENTION

The exemplary embodiments of the present invention are described hereinafter with reference to the accompanying drawings. It should be understood that the present invention is not limited by the configurations in the embodiments described below.

First Embodiment

Figure 1:
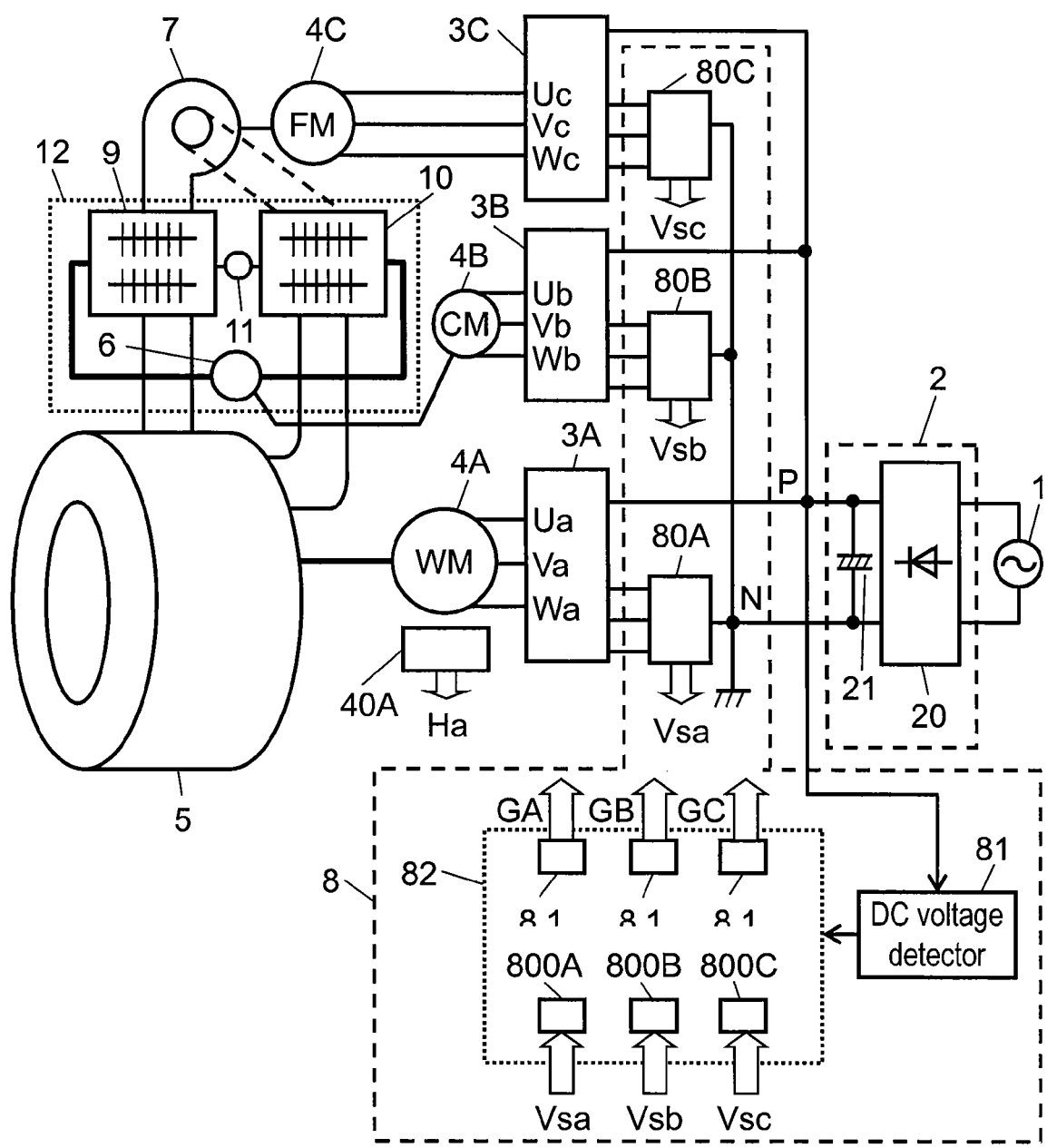
FIG. 1 is a block diagram of a motor-driving apparatus in accordance with a first exemplary embodiment of the present invention.

FIG. 1 is a block diagram of a motor-driving apparatus of a washing and drying machine in accordance with the first exemplary embodiment of the present invention.

In FIG. 1, alternating current (AC) power from AC power supply is fed to rectifying circuit 2 composed of full-wave rectifying circuit 20 and electrolytic capacitor 21 to convert into direct current (DC) power. The DC power is further converted into three-phase AC power, through first inverter circuit 3A, second inverter circuit 3B and third inverter circuit 3C, for driving rotation drum-driving motor (first motor) 4A, compressor-driving motor (second motor) 4B and blow fan-driving motor (third motor) 4C.

Although the description above shows a configuration where rectifying circuit 2 includes single electrolytic capacitor 21, in the case of single-phase 100-V input, practically used is a full-wave voltage-doubler rectifying connection where the circuit includes a plurality of electrolytic capacitors 21. In this case, a booster circuit may be included in the configuration. Besides, a choke coil (not shown) becomes required to reduce voltage ripple and harmonics.

First inverter circuit 3A drives rotation drum-driving motor 4A to operate rotation drum 5. Second inverter circuit 3B drives compressor-driving motor 4B to operate compressor 6. Third inverter circuit 3C drives blow fan-driving motor 4C to rotate blow fan 7. Blow fan 7 sends warm air or cool air into rotation drum 5 to dry clothes in the drum.

Although rotation drum 5 has a horizontal rotation axis in the embodiment, it is not limited thereto; the rotation axis may be forwardly angled in the range of 0° to 45° so that clothes are easily put in and taken out the drum, or as is generally known as a Top-Loader, the drum may have a nearly vertical rotation axis.

Rotation drum-driving motor 4A, compressor-driving motor 4B and blow fan-driving motor 4C are composed of a permanent magnet synchronous motor. Rotor-position sensor 40A, which detects the rotor position of rotation drum-driving motor 4A, outputs a rotor-position signal every 60° in electrical angle. Rotation drum-driving motor 4A is driven with sinusoidal waves in synchronization with the rotor position signal.

On the other hand, compressor-driving motor 4B and blow fan-driving motor 4C have no rotor-position sensor; they are controlled by position sensorless sinusoidal-wave driving.

Controller 8 controls inverter circuits 3A, 3B and 3C. Controller 8 includes first current detector 80A, second current detector 80B, third current detector 80C, DC voltage detector 81 and processor 82. First current detector 80A, second current detector 80B and third current detector 80C have three shunts resistors connected to each emitter terminal of each lower-arm switching transistor (not shown) of first inverter circuit 3A, second inverter circuit 3B and third inverter circuit 3C, respectively. DC voltage detector 81 detects DC voltage of rectifying circuit 2. Processor 82 controls inverter circuits 3A, 3B and 3C according to i) rotor-position signals from rotor-position sensor 40A; ii) output signals from current detectors 80A, 80B, 80C; and iii) output signals from DC voltage detector 81.

According to the embodiment of the present invention, processor 82 is a microcomputer that includes first A/D (analog/digital) converter 800A, second A/D converter 800B, third A/D converter 800C, first pulse-width-modulation controller (hereinafter referred to as PWM controller) 810A, second PWM controller 810B and third PWM controller 810C. A/D converters 800A, 800B and 800C convert an analog signal of current detected at inverter circuits 3A, 3B and 3C, respectively, into a digital signal. Inverter circuits 3A, 3B and 3C are controlled by first PWM controller 810A, second PWM controller 810B and third PWM controller 810C, respectively.

Each of the PWM controllers and the A/D converters satisfactorily functions to control a single three-phase motor. That is, processor 82 includes A/D converters as the same numbers of motors to be controlled—processor 82 of the first exemplary embodiment includes three: A/D converters 800A, 800B and 800C. The A/D converter converts an analog signal of each input terminal into a digital form, for example, 8-bit digital data so as to be manageable by processor 82. Although the configuration introduced above includes a plurality of A/D converters, it is not limited thereto; the same effect can be obtained by a configuration that has a single A/D converter for converting an analog signal into a digital signal. In this case, receiving input signals, the A/D converter processes them one after another, so that as if two or more A/D converters process the data.

Although a microcomputer is adopted for processor 82 in the embodiment, it is not limited thereto; a digital signal processor (abbreviated as DSP), a field programmable gate array (abbreviated as FPGA) can be also adopted for the processor. Besides, a combined use of signal processing of the motor control section having DSP or FPGA and a microcomputer for sequential control is also possible. Particularly, adopting a processor in which the aforementioned configuration is incorporated into a single IC chip reduces a number of components.

When a plurality of PWM controllers and A/D converters are used, a apparatus that incorporates them into a single IC chip offers an advantageous effect. If more controllers and converters are required, or a motor needs a high-speed control, an externally added IC chip can make up for the insufficiency.

In the aforementioned configurations of processor 82, there are some cases where the three motors commonly use software, such as sub-routine programs for coordinate transformation and sinusoidal-wave data. This contributes to simplified software environments. Besides, detecting two or more values of motor current, the processor simultaneously controls first inverter circuit 3A, second inverter circuit 3B and third inverter circuit 3C according to the detected each current value, and controls the different rotating speed of rotation drum-driving motor 4A, compressor-driving motor 4B and blow fan-driving motor 4C.

When two-piston compressor 6 is driven by compressor-driving motor 4B in drying operation, compressed and heated refrigerant (e.g. refrigerant R134a) acts as a condenser for heating air that passes through heat exchanger 9, which is performed in a circulation passage providing communication between rotation drum 5 and blow fan 7. The heated air is thus fed into rotation drum 5. In the meanwhile, refrigerant acts as an evaporator in heat exchanger 10 that is also performed in the circulation passage; the refrigerant expanded and cooled by capillary tube 11 cools damp air fed from rotation drum 5 for dehumidifying. Heat pump 12 having the configuration above effectively uses energy and feeds dry air into rotation drum 5, providing highly efficient drying function.

Although heat pump 12 adopts R134a, which is a CFC (chlorofluorocarbon) substitute, it is not limited thereto; other substances, for example, carbon dioxide ($CO_2$) compressed to a supercritical condition can be used. In this case, a gas cooler is adopted for heat exchanger 9.

In the configuration of the embodiment, blow fan 7 is performed at a halfway position of a passage through which air is sent from heat exchanger 10 to heat exchanger 9. By virtue the configuration, cooled air after passing heat exchanger 10 passes blow fan 7, so that heat caused by loss of blow fan-driving motor 4C is cooled; at the same time, the heat raises the temperature of air before the air flows into heat exchanger 9. That is, the air passing through blow fan 7 becomes an effective source of cooling and heating. Blow fan 7 is not necessarily performed at a mid point between heat exchanger 10 and heat exchanger 9 as is described in the embodiment; it can be performed in other places as long as on the air passage that connects heat exchangers 9, 10 and rotation drum 5.

The configuration in the embodiment adopts two-piston compressor 6. Compared to a compressor having a single piston, the two-piston configuration has less torque ripple in load, providing a stable rotating speed and reducing noise, even with the use of processor 82 having moderate performance capabilities in operation frequency and accuracy. However, a single-piston compressor can be used when no problem occurs. A scroll-type compressor also can be used.

First inverter circuit 3A provides rotation drum-driving motor 4A with vector control. Although a control block diagram is not shown here, the vector control is provided to rotation drum-driving motor 4A as follows: detecting the position of a rotor permanent magnet by position sensor 40A of rotation drum-driving motor 4A; detecting phase current of rotation drum-driving motor 4A from first current detector 800A via first A/D converter 800A; applying d-q coordinate transformation to the three-phase AC current of motor 4A so as to have a vector in the direction of q-axis orthogonal to the direction of d-axis of the rotor permanent magnet; calculating q-axis current Iq and d-axis current Id; determining q-axis current present value Iqs according to difference between a detected value and a present value in rotating speed of motor 4A, on the other hand, determining d-axis current present value Ids according to the present value of the rotating speed of motor 4A; controlling q-axis voltage vector Vq and d-axis voltage vector Vd in a manner that q-axis current Iq and d-axis current Id obtained by the d-q frame transformation have equivalent values to present values Iqs and Ids, respectively; providing inverse transformation from d-q coordinates to three-phase AC voltage coordinates for PWM controller 810A and providing first inverter circuit 3A with PWM control. Rotation drum-driving motor 4A is thus controlled.

In a case where a surface permanent magnet motor is adopted for rotation drum-driving motor 4A, motor 4A can be controlled by open-loop vector control, where current is not detected but obtained from operation.

Second inverter circuit 3B controls compressor-driving motor 4B. Second current detector 80B detects motor current of compressor-driving motor 4B and feeds it to processor 82.

While controlling output voltage of second inverter circuit 3B so that a reactive current vector takes a predetermined value, processor 82 provides inverter circuit 3B with position-sensorless sinusoidal wave driving. Sinusoidal-wave current is thus fed to compressor-driving motor 4B.

Third inverter circuit 3C controls blow fan-driving motor 4C. Third current detector 80C detects motor current of blow fan-driving motor 4C and feeds it to processor 82. While controlling output voltage of third inverter circuit 3C so that a reactive current vector takes a predetermined value, processor 82 provides inverter circuit 3C with position-sensorless sinusoidal wave driving. Sinusoidal-wave current is thus fed to blow fan-driving motor 4C.

Generally, the rotating speed of a permanent magnet synchronous motor is obtained by dividing driving-frequency f by a number of magnetic-pole pairs np. That is, defining driving-frequency f as a fixed value allows compressor-driving motor 4B and blow fan-driving motor 4C to have a fixed rotating speed with no regard of fluctuations in power-supply voltage and in load.

In addition, AC power supply 1 and rectifying circuit 2 are shared among first inverter circuit 3A, second inverter circuit 3B and third inverter circuit 3C. Therefore, each time rotation drum 5 having clothes therein starts and stops rotation in drying operation, fluctuations in DC power-supply voltage considerably increases due to load of clothes and the like. However, according to the configuration of the embodiment, compressor-driving motor 4B and blow fan-driving motor 4C are controlled in a manner that the driving frequency of motor 4B and motor 4C is fixed to a predetermined value and a reactive current vector takes a predetermined value. The control allows compressor-driving motor 4B and blow fan-driving motor 4C to have a fixed rotating speed with no regard of fluctuations in power-supply voltage, suppressing increase in vibration noise of compressor 6 and blow fan 7. That is, harsh noise due to fluctuations in rotating speed can be reduced.

Figure 2:
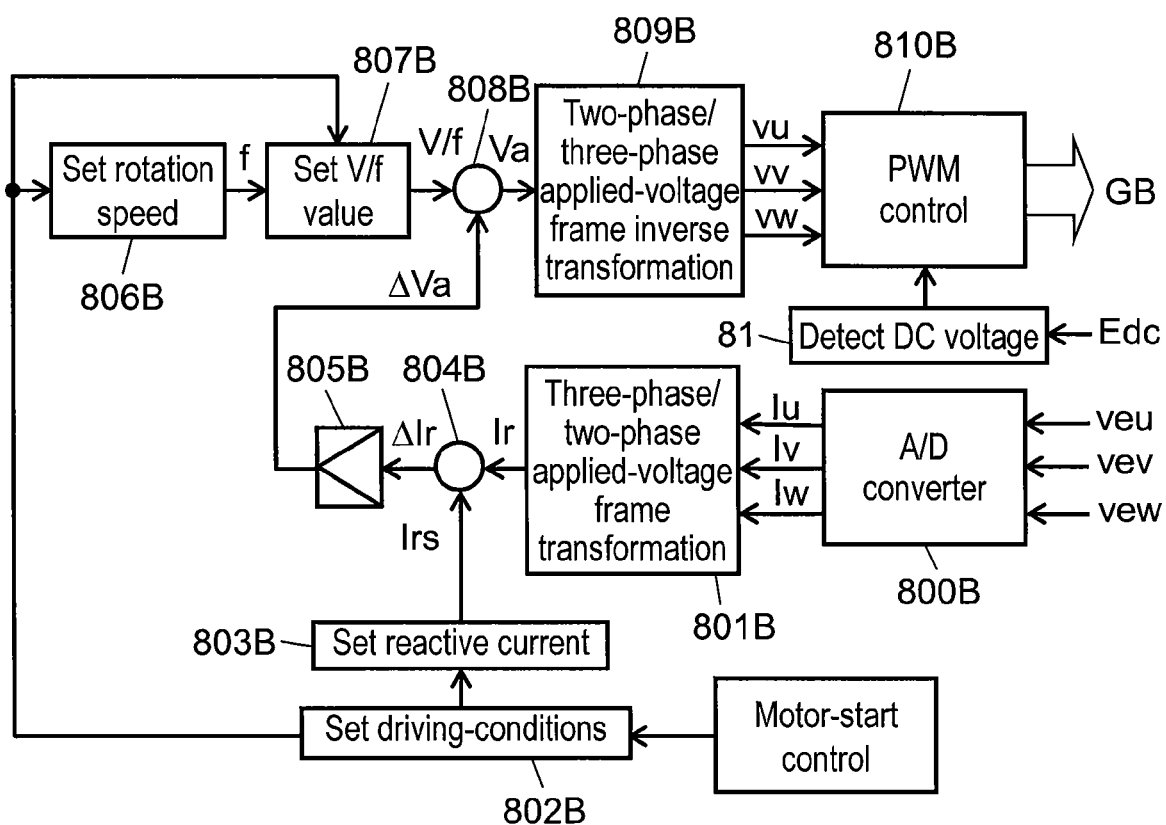
FIG. 2 is a control block diagram of inverter circuits of the motor-driving apparatus.

FIG. 2 is a block diagram showing how processor 82 controls second inverter circuit 3B in the first exemplary embodiment. The control on third inverter circuit 3C is exactly alike.

Figure 3:
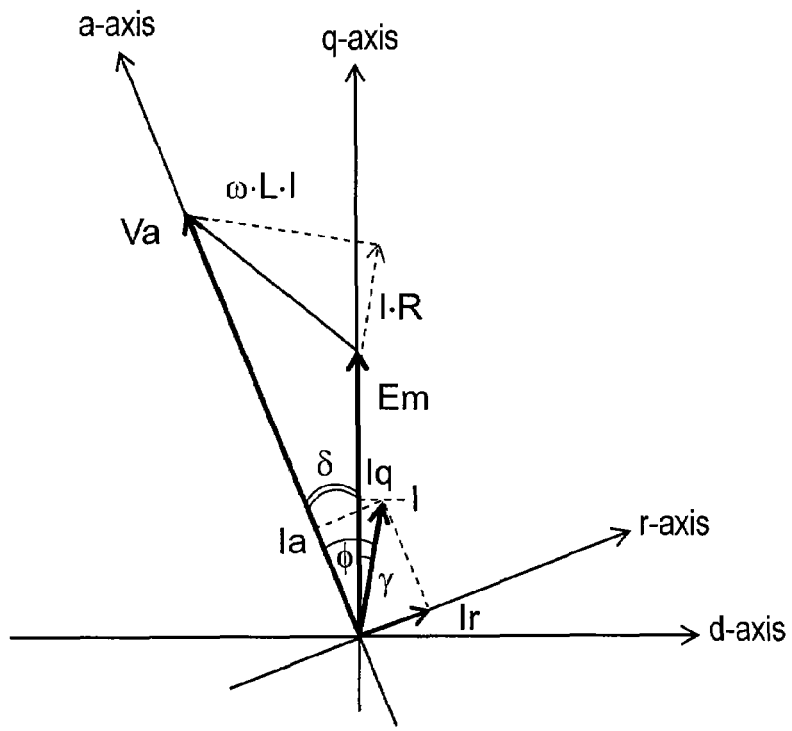
FIG. 3 is a vector diagram of a surface permanent magnet synchronous motor of the motor-driving apparatus.

FIG. 3 is a control vector diagram of the embodiment; specifically, it shows a relationship between a rotating magnetic field axis (d-q frame) and inverter output voltage axis (a-r frame) in a surface permanent magnet motor. In the diagram, motor current I is divided into a-axis component Ia, which has a direction the same as inverter output voltage Va, and r-axis component Ir that is orthogonal to the inverter output voltage axis (a-axis). φ represents phase difference between current I and voltage Va; γ represents phase difference between current I and Back EMF Em; and δ represents phase difference (internal phase difference angle) between voltage Va and Back EMF Em. A surface permanent magnet motor offers a stable rotation by controlling reactive current Ir or active current Ia in a manner that current phase has a slight delay from q-axis. When fluctuations in load are small, it is also effective in controlling the ratio between reactive current Ir and active current Ia (power factor) or power-factor angle φ.

Figure 4:
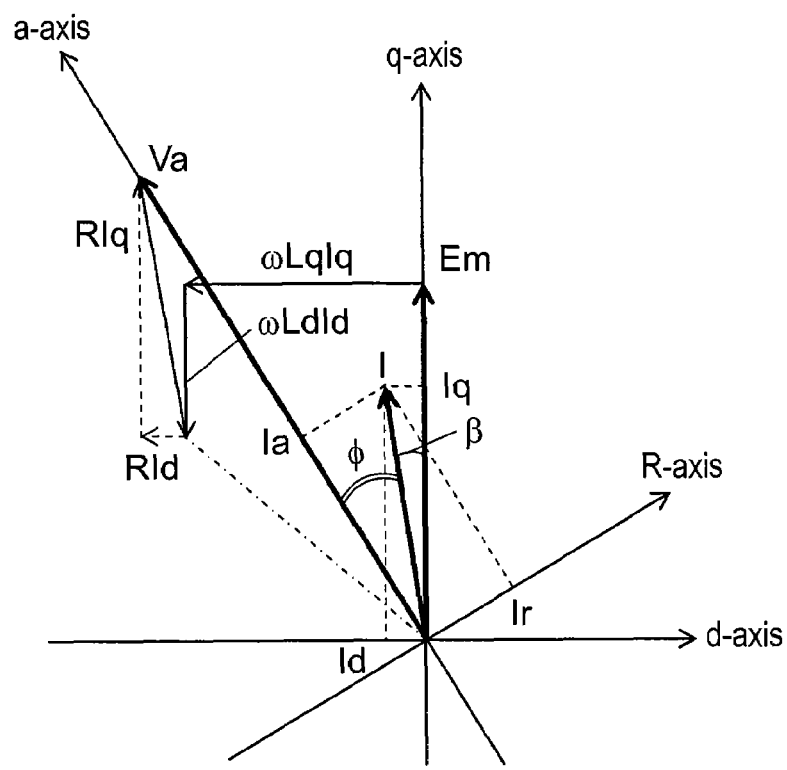
FIG. 4 is a vector diagram of an interior permanent magnet synchronous motor of the motor-driving apparatus.

FIG. 4 is a vector diagram of an interior permanent magnet synchronous motor (abbreviated as IPMSM) of the first exemplary embodiment. The diagram shows an operation state where the phase of the current leads by angle β from q-axis. In the case where a motor-driving apparatus adopts an IPMSM that has a vector diagram slightly different from that shown in FIG. 3, inductance value L exhibits a big difference between in the direction of d-axis and in the direction of q-axis; Lq (q-axis inductance)>Ld (d-axis inductance), which generates reluctance torque. This contributes to a high-torque operation with stability even under the operation state where the phase of the current leads by angle β from q-axis. The phase of current I has a slight delay with respect to voltage Va in the direction of a-axis.

Like the surface permanent magnet motor, the interior permanent magnet synchronous motor also offers a stable rotation by controlling reactive current Ir.

In FIG. 2, output signals veu, vev and vew corresponding to U-phase, V-phase and W-phase, respectively, of three-shunts type second current detector 80B (FIG. 1) are fed into A/D converter 800B. Receiving the output signals, A/D converter 800B outputs current signals Iu, Iv and Iw that correspond to each phase current to three-phase/two-phase applied-voltage frame transforming section 801B. Transforming section 801B converts three-phase current into two-phase current and then operates active current vector Ia and reactive current vector Ir by expression (1) below:

$$\begin{bmatrix} Ir \\ Ia \end{bmatrix} = \begin{bmatrix} \cos\theta & \sin\theta \\ -\sin\theta & \cos\theta \end{bmatrix} \times \sqrt{\frac{2}{3}} \times \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Iu \\ Iv \\ Iw \end{bmatrix} \quad \text{expression (1)}$$

$$= \sqrt{\frac{2}{3}} \times \begin{bmatrix} \cos\theta & \cos(\theta - 2\pi/3) & \cos(\theta - 4\pi/3) \\ -\sin\theta & -\sin(\theta - 2\pi/3) & -\sin(\theta - 4\pi/3) \end{bmatrix} \begin{bmatrix} Iu \\ Iv \\ Iw \end{bmatrix}.$$

Current comparing section 804B receives reactive current vector Ir from three-phase/two-phase applied-voltage frame transforming section 801B and reactive current set signal Irs from driving condition determining section 802B via reactive current determining section 803B. Current comparing section 804B operates error signal ΔIr between signal Irs and signal ΔIr, and sends it to error signal calculator 805B. Receiving error signal Δir, calculator 805B obtains voltage correction signal ΔVa by proportional-plus-integral control. Driving condition determining section 802B outputs motor driving conditions suitable for rotating speed and load torque. Rotating speed determining section 806B performed in an open loop (as is shown in FIG. 2) determines driving frequency f. V/f determining section 807B determines voltage according to driving frequency f and obtains the ratio of the voltage applied to the motor and the driving frequency, i.e., V/f value. The value is fed to output voltage correcting section 808B.

Output voltage correcting section 808B operates inverter output voltage Va using expression (3) below, by multiplying Back EMF, which is obtained from rotating speed N and Back EMF constant Ke, by a predetermined constant (applied voltage constant kr) and add voltage correction signal ΔVa. With the use of expression (2) below, two-phase/three-phase applied-voltage frame inverse transformer 809B operates output voltage signals Vu, Vv and Vw (corresponding to phases U, V and W). Voltage correction signal ΔVa equals to the sum of the value obtained by multiplying error signal ΔIr by proportional constant Kp and the value obtained by multiplying the integration value of error signal ΔIr by integral constant Ks, as is shown in expression (3) below.

$$\begin{bmatrix} Vu \\ Vv \\ Vw \end{bmatrix} = \sqrt{\frac{2}{3}} \times \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} Vr \\ Va \end{bmatrix} \quad \text{expression (2)}$$

$$= \sqrt{\frac{2}{3}} \times \begin{bmatrix} \cos\theta & -\sin\theta \\ \cos(\theta - 2\pi/3) & -\sin(\theta - 2\pi/3) \\ \cos(\theta - 4\pi/3) & -\sin(\theta - 4\pi/3) \end{bmatrix} \begin{bmatrix} Vr \\ Va \end{bmatrix}$$

$$Va = N \times Ke \times kr + \Delta Va \quad \text{expression (3)}$$
$$= N \times Ke \times kr + Kp \times \Delta Ir + Ks \times \int \Delta Ir$$

The value of r-axis voltage component Vr on the inverter output voltage axis (a-r frame) takes zero, and therefore operation for Va is only needed in expression (2). PWM controller 810B provides the inverter circuit with PWM-control with the use of a triangular-wave carrier signal of ultrasonic frequency and outputs inverter-control gate signal GB for controlling six switching-transistors. DC voltage detector 81 detects DC voltage Edc of rectifying circuit 2 and controls modulation factor M of PWM controller 810B inverse proportion to DC voltage Edc. Through the control, inverter output voltage is kept at a consistent level even when voltage fluctuations occur, at the same time, the inverter output voltage is protected from hunting or stall caused by voltage fluctuations.

Output voltage Vo of sinusoidal-wave driving is obtained from expression (4) below. The output voltage varies in proportion to DC voltage Edc when modulation factor M takes a fixed value. Expression (5) shows that a consistent output is obtained by converting modulation factor M into Ml according to the ratio of DC voltage Edc to standard DC voltage Eds.

$$V0 = Edc \times M \times \sin\omega t \quad \text{expression (4)}$$

$$M1 = \frac{Eds}{Edc} M \quad \text{expression (5)}$$

However, output voltage Vo tends to decrease roughly in proportion to DC voltage Edc under the influence of dead time td. If modulation factor Ml takes a value inverse proportion to DC voltage Edc, output voltage Vo decreases. Therefore, the output voltage is corrected, for example, by adding PWM duty that corresponds to a dead time.

$$Vo = Edc \times \left( M1 \times \sin\omega t - \frac{td}{pwmo} \right) \quad \text{expression (6)}$$

The advantage of the reactive current constant control method—where the inverter output voltage is controlled in a manner that reactive current Ir is kept at present value Irs—is in the fact that, even in driving frequency-fixed control, phase φ of the current or internal phase difference angle δ automatically varies according to fluctuations in load. Integral control of error signal ΔIr offers reliable operations with stability against variations ranging from the rated load to no load.

The stable operations above are obtained even in the following undesired states that can occur:
a state where the temperature of heat exchanger 9 is too low to operate properly, which often occurs just after start-up of compressor 6;
a state where an air-blow opening of blow fan 7 is covered with clothes, or a state where blow fan 7 cannot feed air because rotation drum 5 is filled with clothes.

In general, the rotating speed of a compressor-driving motor is adjusted to 6000 r/min.-8000 r/min. A compressor-driving motor adopts a salient-pole interior permanent magnetic (IPM) motor to provide high-speed rotation control by using advance-angle control.

Experiments carried out by the inventors tell that having advance angle β of 25° to 30° maximizes torque to current and minimizes copper loss to output. Besides, under the condition where copper has a fixed amount, when the number of winding of second motor 4B is changed to keep the maximum supply voltage fed from second inverter circuit 3B below a predetermined value that corresponds to an output voltage of the rectifying circuit 2, the current fed from second inverter circuit 3B becomes the minimum value under the condition where advance angle β equals to 45°. The experiments have proved the following advantages: the configuration allows second inverter circuit 3B to be composed of an inexpensive switching device having small current capacity, such as insulated gate bipolar transistor (abbreviated as IGBT); and the configuration decreases loss of second inverter circuit 3B.

Determining a present value of reactive current so as to have advance angle β ranging from 25° to 45° offers rotation driving control with high efficiency and low cost.

In addition to the aforementioned reactive current constant control method, the configuration can adopt a phase (φ)-fixed control method or an active current (Ia)-fixed control. In this case, however, DC voltage-drop at around zero volts of AC voltage due to an increased ripple in DC power voltage Edc often invites an excessive advance angle, resulting in unstable rotation. It is therefore necessary to control a modulation factor according to DC voltage Edc so as to keep a proper advance angle.

In the active current constant control, the control performance against fluctuations in load tends to degrade when the driving frequency is kept at a constant level; in normal operations, keeping the rotation at a constant speed provides required compression operations of the compressor and the volume of air supplied by the blow fan with no problem.

According to the embodiment, controller 8 controls three inverter circuits 3A, 3B and 3C by single processor 82; accordingly, controller 8 includes three PWM controllers 810A, 810B, 810C, and three A/D converters 800A, 800B, 800C that convert analog signals detected by three current detectors 80A, 80B, 80C, respectively, into digital signals. A/D converters 800A, 800B and 800C carry out A/D conversion in synchronization with PWM controller 810A, 810B and 810C, respectively. The three PWM controllers themselves operate while taking synchronization of the phase of carrier waves among the three.

Figure 5:
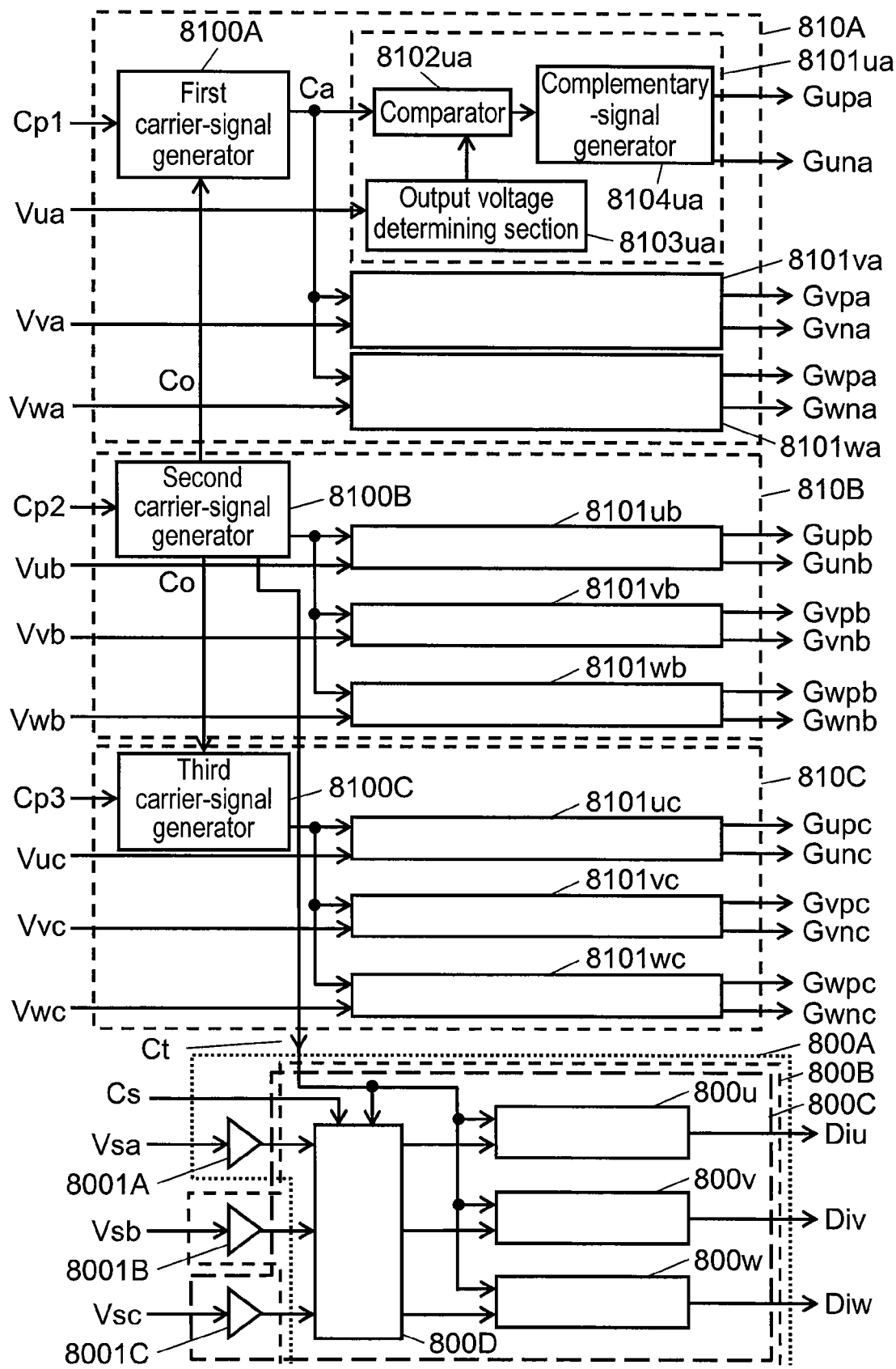
FIG. 5 is an in-detail block diagram of PWM controllers and A/D converters of the motor-driving apparatus.

FIG. 5 is a block diagram of A/D converters 800A, 800B, 800C and PWM controllers 810A, 810B, 810C of controller 8.

A/D converters 800A, 800B and 800C include amplifiers 8001A, 8001B and 8001C, respectively, at each input section. The three amplifiers provides analog output signals Vsa, Vsb and Vsc fed from current detectors 80A, 80B and 80C, respectively, with level-shifting, amplification, and noise-reduction so as to give a proper amplitude in the range of GND to 5V. In the embodiment, after passing each of the three amplifier, the analog signals are fed into multiplexer 800D. Multiplexer 800D selectively outputs the signals to A/D converters 800U, 800V and 800W, where the analog signals are converted into a digital form.

Each of the analog output signals (Vsa, Vsb, Vsc) fed from the current detectors (80A, 80B, 80C) includes three-phase current signals Iu, Iv, Iw; multiplexer 800D receives nine analog signals in total. Multiplexer 800D selects three current signals Iu, Iv, Iw of one motor from the nine according to input-select signal Cs. For example, when first motor 4A is selected, multiplexer 800D selects three-phase current signals Iu, Iv, and Iw of first motor 4A that are detected by first current detector 80A. Receiving A/D conversion start-up signal Ct, multiplexer 800D outputs the signals to A/D converters 800U, 800V and 800W, where the signals are converted into digital output signals Diu, Div and Diw.

As described above, three A/D converters 800U, 800V and 800W are responsible for each current signal of the three phases. In the configuration of the embodiment, by operating three A/D converters with a time delay one after another, they serve as converters 800A, 800B and 800C capable of detecting output current of the three inverter-circuits in several microseconds. Although the configuration of the embodiment adopts multiplexer 800D, it is not limited thereto. For example, disposing nine A/D converters allows all the three-phase current signals of three motors to be simultaneously detected. As another possible structure, the controller can include A/D converters where each U-phase current signal of the different three motors undergo simultaneous conversion, using a multiplexer as is in the structure of the embodiment.

First PWM controller 810A, which controls first inverter circuit 3A, is composed of first carrier-signal generator 8100A for producing triangular-wave signals, U-phase PWM circuit 8101ua, V-phase PWM circuit 8101va and W-phase PWM circuit 8101wa.

U-phase PWM circuit 8101ua includes comparator 8102ua, output voltage determining section 8103ua, complementary-signal generator 8104ua. Comparator 8102ua compares output signal Ca from carrier signal generator 8100A with an output signal from output voltage determining section 8103ua and then outputs a PWM signal. Receiving the PWM signal, complementary-signal generator 8104ua provides the signal with a waveform-shaping process, such as application of an inversion signal and dead time, and outputs U-phase upper-arm control signal Gupa and U-phase lower-arm control signal Guna.

V-phase PWM circuit 8101va and W-phase PWM circuit 8101wa operate exactly alike; the description thereof will be omitted.

Second PWM controller 810B, which controls second inverter circuit 3B, is composed of second carrier-signal generator 8100B for producing triangular-wave signals, U-phase PWM circuit 8101ub, V-phase PWM circuit 8101vb and W-phase PWM circuit 8101wb.

Third PWM controller 810C, which controls third inverter circuit 3C, is composed of third carrier-signal generator 8100C for producing triangular-wave signals, U-phase PWM circuit 8101uc, V-phase PWM circuit 8101vc and W-phase PWM circuit 8101wc.

Second PWM controller 810B and third PWM controller 810C operates in a manner similar to first PWM controller 810A; the description thereof will be omitted.

According to the configuration of the embodiment, carrier signal generators 8100A, 8100B and 8100C of each PWM controller operate on synchronous workings so that three PWM controllers 810A, 810B and 810C has synchronous operations. First motor 4A and third motor 4C have a configuration that is susceptible to vibration noise of audio frequency. From the reason, carrier frequency f1 is set to 16 kHz close to the upper limit of the audio frequency so as not to be uncomfortable to the human's ear. In second motor 4B, on the other hand, carrier frequency f2 is set to 4 kHz, that is, the ratio of f1 to f2 is 4:1. This is because not only the configuration from which vibration noise of the carrier frequency component is hard to escape, but also the need to suppress leak current via refrigerant against shock hazards that can occur in a washing machine.

Considering the structural difference, as described above, first and third carrier-signal generators 8100A, 8100C have clock pulses Cp1, Cp3, respectively, of 8.192 MHz, attaining triangular-wave PWM control with 8-bit resolution. On the other hand, second carrier-signal generator 8100B adopts a clock pulse of 2.048 MHz that is one-fourth the clock pulse Cp1 (Cp3). With the use of the carrier frequencies and clock pulses above, the configuration of the embodiment has a reset process, where the initial value (255) is given to carrier-signal generators 8100A and 8100C so as to be timed at the overflow and underflow of the counter of second carrier-signal generator 8100B. In this way, carrier-signal generators 8100A, 8100C work on triangular-wave operations in synchronization with carrier-signal generator 8100B.

The configuration of the embodiment includes carrier-signal generators 8100A, 8100B and 8100C dedicated for PWM controllers 810A, 810B and 810C, respectively.

In the synchronized PWM period of inverter circuits 3A, 3B and 3C, detecting current in a period during which all of the transistors is kept ON or OFF avoid being influenced by power switching noise.

Figure 6:
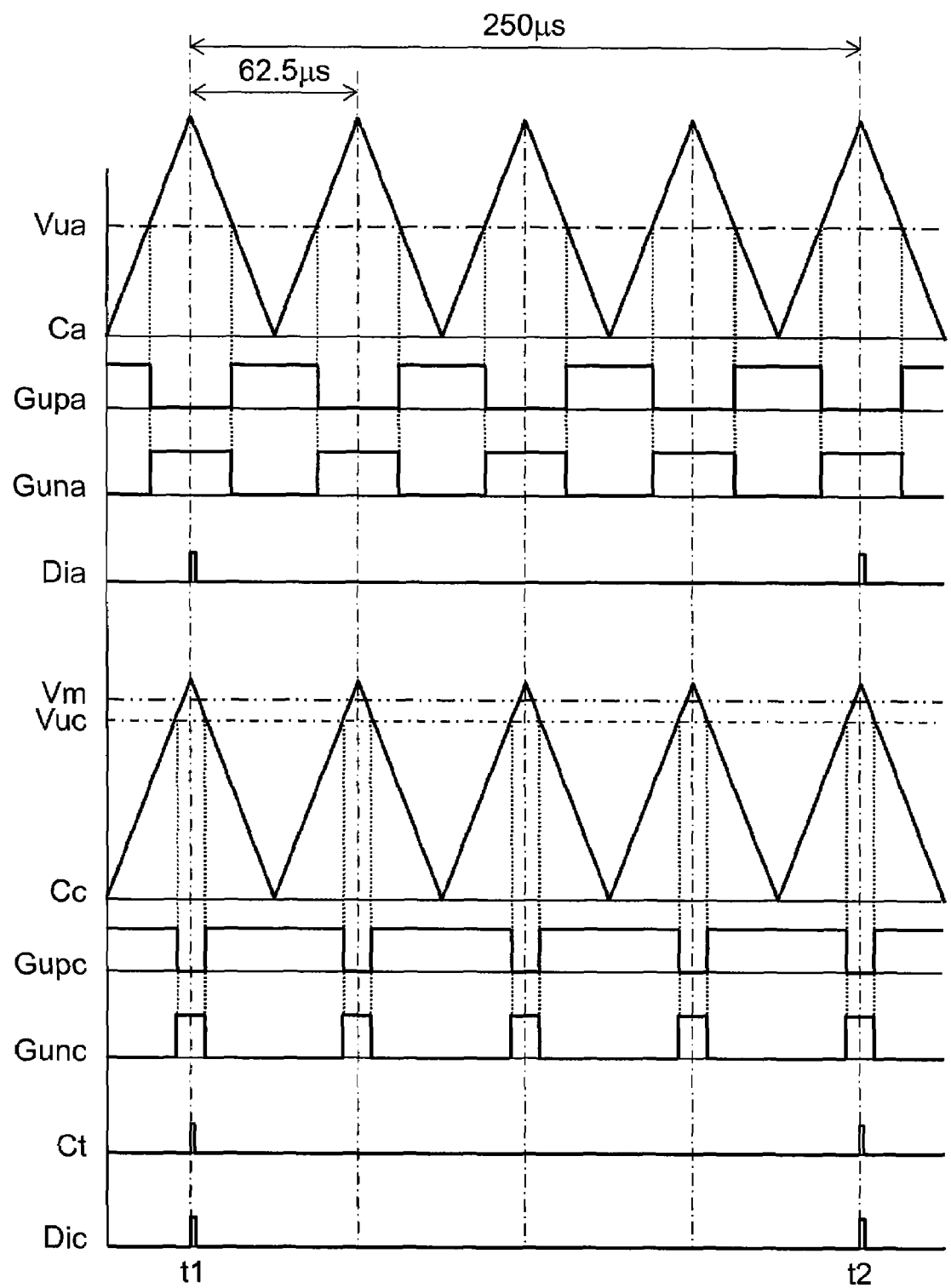
FIG. 6 is a timing chart of current detection in motors 4A and 4C of the motor-driving apparatus.

FIG. 6 is a timing chart showing each operating wave of PWM controllers 810A, 810C and A/D converters 800A, 800C of the first exemplary embodiment. Signal names shown on the left side of each waveform correspond to those shown in FIG. 5.

Although the chart focuses on U-phase, V-phase and W-phase work exactly alike.

Carrier-signal Ca is identical to carrier-signal Cc in a triangular waveform. As Vua and Vuc (indicated by alternate long and short dashed lines) increase, PWM duty (i.e., the ratio of ON period) of upper-arm control signals Gupa and Gupc increases, whereas PWM duty of lower-arm control signals Guna and Gunc decreases. This increases inverter output voltage.

In the chart, Ct represents the A/D conversion start-up signal synchronized with the carrier signal; Dia represents the moment at which the output current signal of inverter circuit 3A undergoes A/D conversion; and Dic represents the moment at which the output current signal of inverter circuit 3C undergoes A/D conversion. The A/D conversion is carried out when the lower-arm transistor is kept ON. Vm represents the output voltage limit-setting signal that prevents the transistor from switching operations during the A/D conversion period. Signal Vm also limits the minimum pulse width of lower-arm control signal Gunc. This is also true in the case of first motor 4A.

A/D conversion starting signal Ct appears at time t1 and t2 in every four peaks of triangular-wave carrier signals Ca, Cc. Actually, as for inverter circuits 3A and 3C, the switching operation of output signal Vsa from current detector 80A and output signal Vsc from current detector 80C by multiplexer 800D performs the time-sharing usage of A/D converters 800U, 800V and 800W As a result, all of the three-phase current signals of motors 4A and 4C undergoes A/D conversion almost at the same time every four carrier-signals.

Although the configuration of the embodiment adopts the current detection in which all of the three-phase current signals of motors 4A and 4C is detected every four carrier-signals, it is not limited thereto; current detection every 8 carrier-signals or every 12 carrier-signals—where the current signals are detected on a one-by-one basis for each motor—is also applicable. This is effective in the case where the conversion speed of an A/D converter is low or processor 82 operates at full capacity. In addition, if the number of inverter circuits increases, controlling current detection and coordinate transformation within a four-carrier period allows the increased motor-driving tasks to complete within the period. That is, the number of inverter circuits can be increased by increase in selection of the PWM controller and the multiplexer without the need for an additional A/D conversion unit occupying a larger space.

The configuration of the embodiment, as described above, includes the three A/D converters (800U, 800V, 800W) that operate simultaneously; the three-phase current signals of one motor are simultaneously converted into a digital form. The configuration is therefore apparently effective in terms of processing speed and algorithm.

Figure 7:
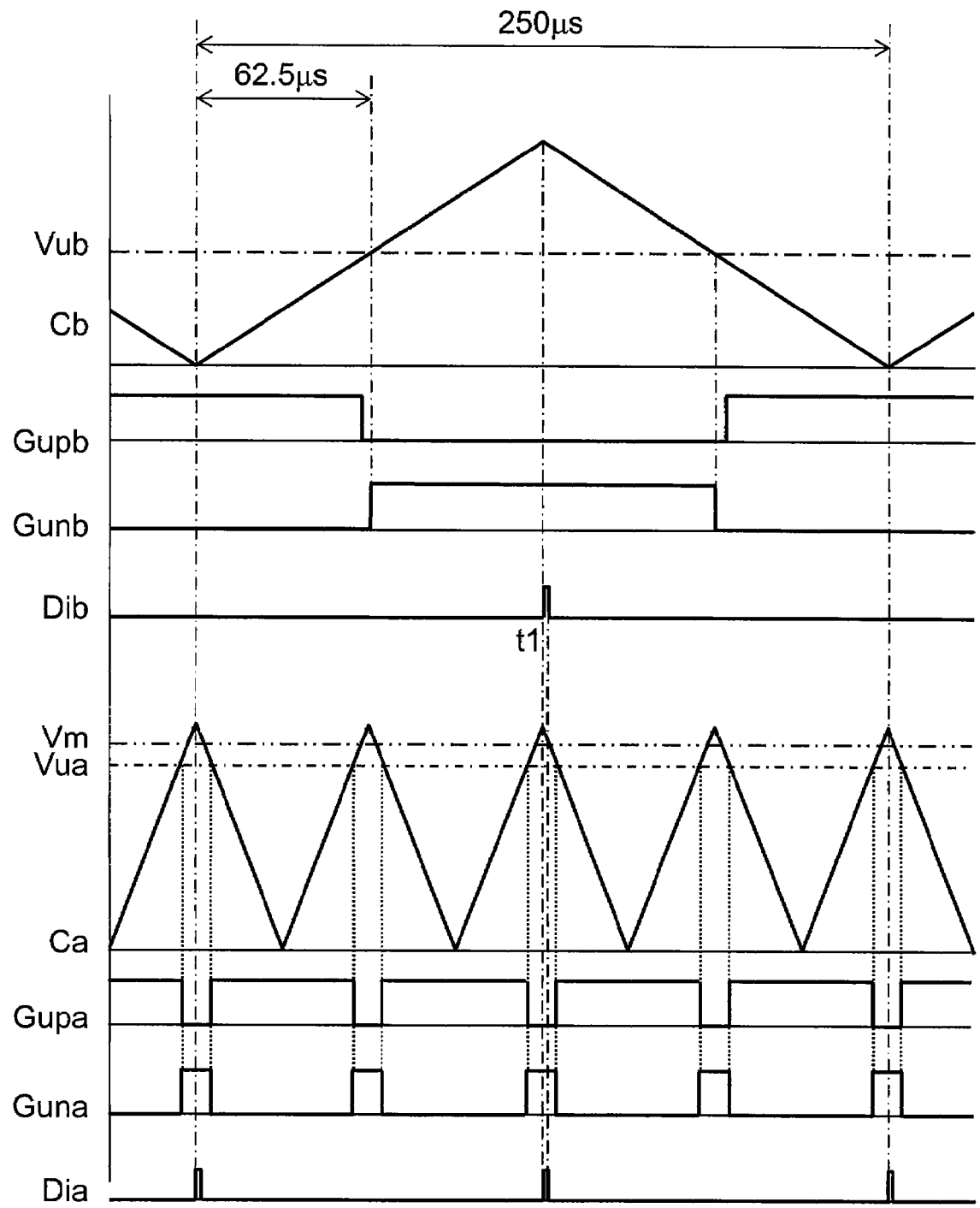
FIG. 7 a timing chart of current detection in motors 4A and 4B of the motor-driving apparatus.

FIG. 7 is a timing chart showing each operating wave of PWM controllers 810B, 810A and A/D converters 800B, 800A of the first exemplary embodiment. Signal names shown on the left side of each waveform correspond to those shown in FIG. 5.

Although the chart focuses on U-phase, V-phase and W-phase work exactly alike.

The period ratio of carrier signal Ca to carrier signal Cb is 1:4. Since the period of carrier signal Cb is even-multiples of that of carrier signal Ca, the peaks and valleys of carrier signal Cb coincide with a peak of carrier signal Ca.

Therefore, Operating multiplexer 800D for A/D conversion timed to the peak of carrier signal Cb allows the three-phase current signals of motors 4A and 4B to be detected under a stable condition without switching noise interference.

Besides, controlling the A/D conversion of motor 4A so as to be timed to the peaks and valleys of carrier signal Cb increases the amount of data to be processed, improving not only accuracy of current detection but also response speed.

When the period of carrier signal Cb is odd-multiples of that of carrier signal Ca, possible ways of synchronizing of the two signals are as follows: a) a peak of signal Cb is timed to a peak of signal Ca and a valley of signal Cb is timed to a valley of signal Ca; or b) a peak of signal Cb is timed to a valley of signal Ca and a valley of signal Cb is timed to a peak of signal Ca.

The synchronization of carrier signals described above provides three PWM controllers 810A, 810B and 810C with synchronous operations. Besides, three A/D converters 800A, 800B and 800C carry out A/D conversion in synchronization with the operations of PWM controllers 810A, 810B and 810C. Time t1 shown in FIG. 6 and time t1 shown in FIG. 7 is the same time.

Figure 8:
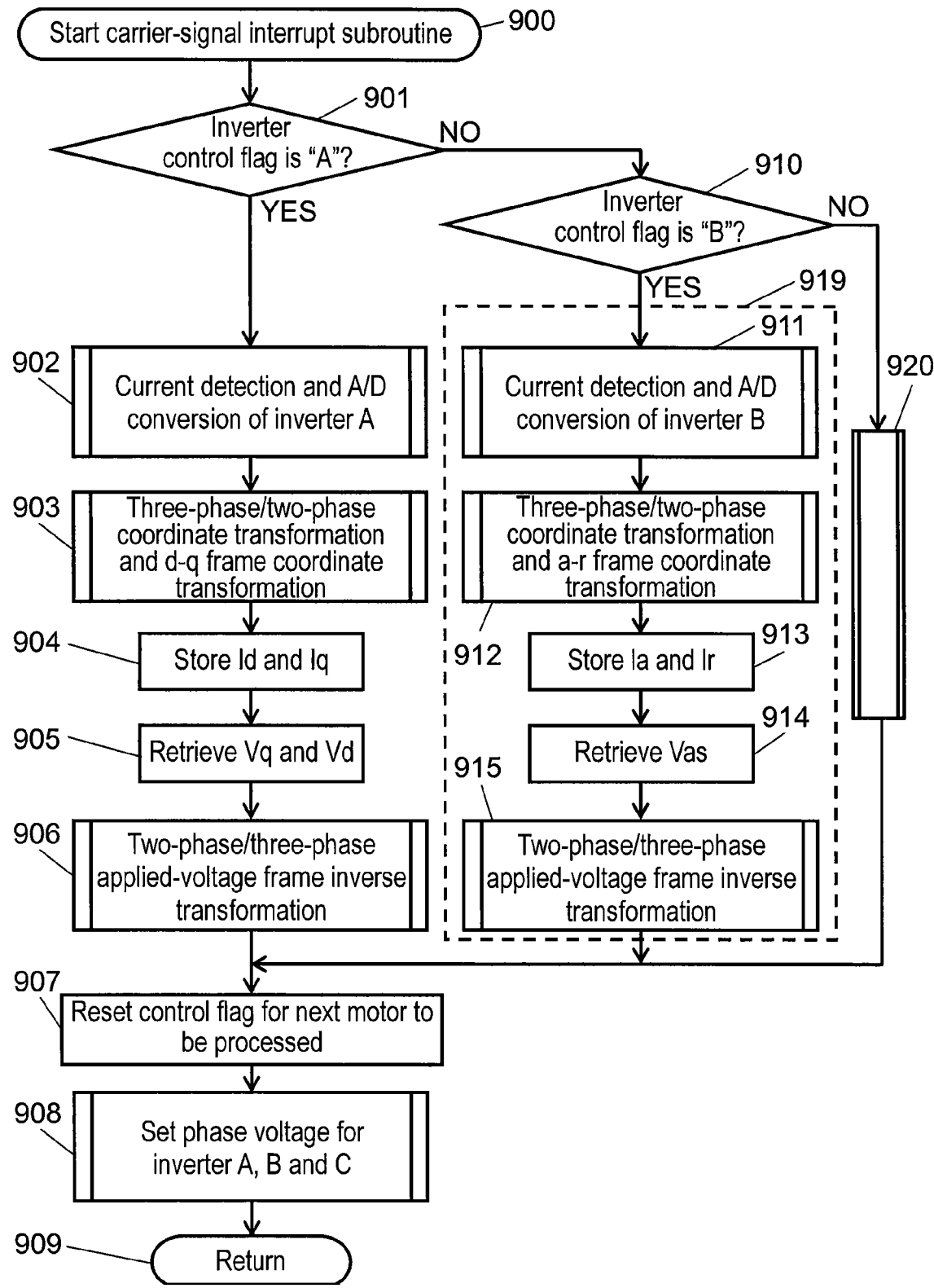
FIG. 8 is a flow chart illustrating a carrier-signal interrupt subroutine of the motor-driving apparatus.

FIG. 8 is a flow chart illustrating the process of current detection and vector operation by the synchronized PWM-control of the simultaneously driving three inverter-circuits 4A, 4B, 4C of the first exemplary embodiment.

Triangular wave-shaped carrier signal Cb has a peak at time t1, t2 (FIG. 6) and time t1 (FIG. 7). At this time, a carrier-signal interrupt signal is produced; accordingly, an interrupt subroutine starts with step 900. The routine has the following process:

In step 901, if a predetermined control flag is "A" (that shows first inverter circuit 3A is to be processed), the process goes to step 902, performing current detection and A/D conversion of first inverter circuit 3A (step 902), calculating d-axis current value Id and q-axis current value Iq by three-phase/two-phase coordinate transformation and d-q frame transformation (step 903), storing Id and Iq in the memory (step 904); values Id, Iq are used for operation of q-axis voltage instruction value Vq in the motor control main flow, retrieving q-axis voltage instruction value Vq and d-axis voltage instruction value Vd from the main flow (step 905), providing values Vq and Vd with inverse transformation to obtain phase-voltage values Vu, Vv, Vw (step 906), changing the data of the control flag for the motor to be processed (in this case, "B") in the next interrupt-service routine (step 907), setting the PWM-control set voltage suitable for each phase-voltage of inverter circuits 3A, 3B and 3C to all of the output voltage setting sections (step 908), returning to the main flow (step 909).

After a lapse of 250 microseconds, the procedure of the routine starts again. This time, the control flag includes "B", which means that second inverter 3B is to be processed. Therefore, the procedure goes to step 910 to have judgment of the control flag; since it is "B", the process for second inverter circuit 3B starts, following the similar procedure for inverter circuit 3A:

performing current detection and A/D conversion of second inverter circuit 3B (step 911); as described earlier, compressor-driving motor 4B is controlled by sensorless sinusoidal-wave driving with the use of a reactive current constant control, calculating active-current vector Ia and reactive-current vector Ir by three-phase/two-phase coordinate transformation and applied voltage frame (a-r frame) transformation (step 912), storing Ia and Ir in the memory (step 913); meanwhile, in the main flow, detecting a error signal between reactive current Ir and present value Irs and providing applied voltage Va with proportional-plus-integral control, retrieving applied voltage present value Vas from the main flow (step 914), providing value Vas with inverse transformation to obtain applied voltage of the three phases (step 915), changing the data of the control flag for the motor to be processed (in this case, "C") in the next interrupt-service routine (step 907).

After that, the procedure goes to step 908 and then step 909.

A series of processes of step 911 to step 915 is step-group 919 for second inverter circuit 3B. Similarly, step-group 920 is prepared for third inverter circuit 3C, which includes, for example, operation of a reactive-current vector. When the next interrupt occurs, step-group 920 is performed, provided that control flag "C" is found in step 901 and step 910.

The flow chart described above shows that three motors 4A, 4B and 4C are controlled one after another at an interval of 250 microseconds; each motor is controlled every 750 microseconds. When an inverter-driving frequency (also known as an electrical-angle frequency) is high, the aforementioned three-phase output control every 750 microseconds can often fail to offer a proper sinusoidal-wave driving. In such a case, enhancing the processing speed of processor 82 so as to complete the control of all the motors within the carrier frequency of 4 kHz can solve the problem; at least, as for the configuration used in steps 906 and 915 for two-phase/three-phase applied voltage frame inverse transformation, it should instantly determine angle θ (i.e., the phase of voltage, or the electrical angle of a rotor) every Ct-periods (every 250 microseconds) that is different interval from the period of A/D conversion. Besides, as for motors 4A and 4C with a carrier-frequency of 16 kHz, controlling the process so as to complete within each carrier-period (every 62.5 microseconds) provides the voltage and current for each motor with a sinusoidal waveform, even if the control intervals on d-q plane or a-r plane is relatively long. With the configuration above, vibration noise and vibration is further reduced. As described above, the flow chart suggests many possibilities in selecting structural components.

The configuration of the embodiment obtains the following values through operations: a reactive current vector; a control amount derived from difference between present values; and values relating to output for second PWM controller 810B. There are similarities between the operations and the vector control explained in the description of first inverter circuit 3A. For example, the vector control adopts angle θ as a rotation angle with reference to d-axis or q-axis, while the operation of active current and reactive current adopts angle θ as a phase angle with reference to the output-voltage axis (a-axis) of second inverter circuit 3B. Although having the difference above, they share the parts of the control block diagram. Compared to a configuration that includes a plurality of processors each of which drives each motor, the configuration of the embodiment has commonly usable software; accordingly, saving memory spaces. An effective driving control with sinusoidal waves can be expected by the configuration in which single processor 82 controls a plurality of motors.

On the other hand, in a configuration that includes a plurality of processors each of which drives each inverter circuit, the similar effect is obtained by synchronization with the use of a signal transmission path and carrier frequencies having a ratio of integer multiples. In this case, however, necessity for adopting a high-speed signal transmission path inevitably raises the production cost.

As for the motor-relating operation, the rate at which work is done (i.e., power) can be obtained—other than q-axis current, d-axis current, reactive current and active current—from current data fed from a current detector to an A/D converter. For example, each motor input (electric power) can be obtained by the expression below: Va·I·cos φ (where, Va represents two-phase transformation-given output voltage of each inverter circuit; I represents output current; and φ represents power factor). The power also can be obtained by multiplying the product of line voltage and line current of one-phase with the square root of 3.

On the other hand, motor output (mechanical power) can be obtained by multiplying the product of q-axis current and angular velocity ω with a constant (that corresponds to the value of flux linkage of a permanent magnet).

Besides, input power (electric power) for each inverter circuit can be operated by multiplying inverter input DC voltage, which is detected by DC voltage detector 81, with average output of a current detector (A/D-converted value·ON-period ratio). Such obtained input power can be used for determining the upper power-limit of each motor, or the upper limit of the electric power totally consumed by the washing and drying machine.

In particular, the configuration adopting the reactive current constant control quickly operates the motor input by multiplying active current Ia (=I·cos φ) with inverter output voltage Va. Controlling the rotating speed of the rotation drum-driving motor or the compressor-driving motor allows AC input to have a value lower than a predetermined value.

Second Embodiment

Figure 9:
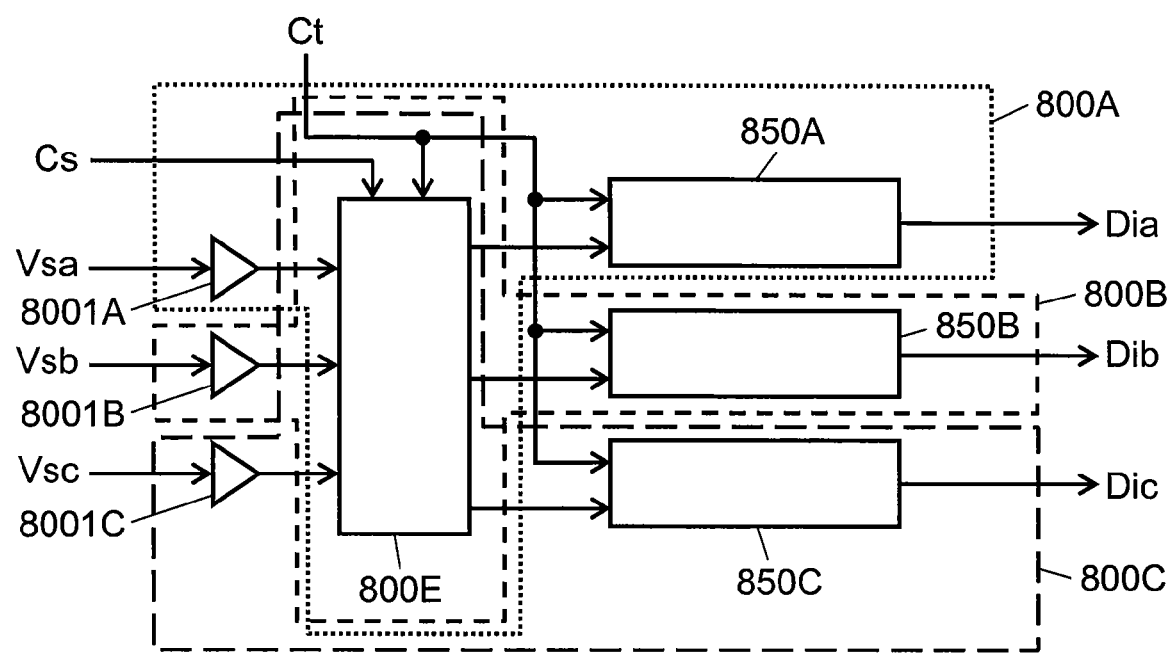
FIG. 9 is a block diagram of an A/D converter in accordance with a second exemplary embodiment of the present invention.
Figure 10:
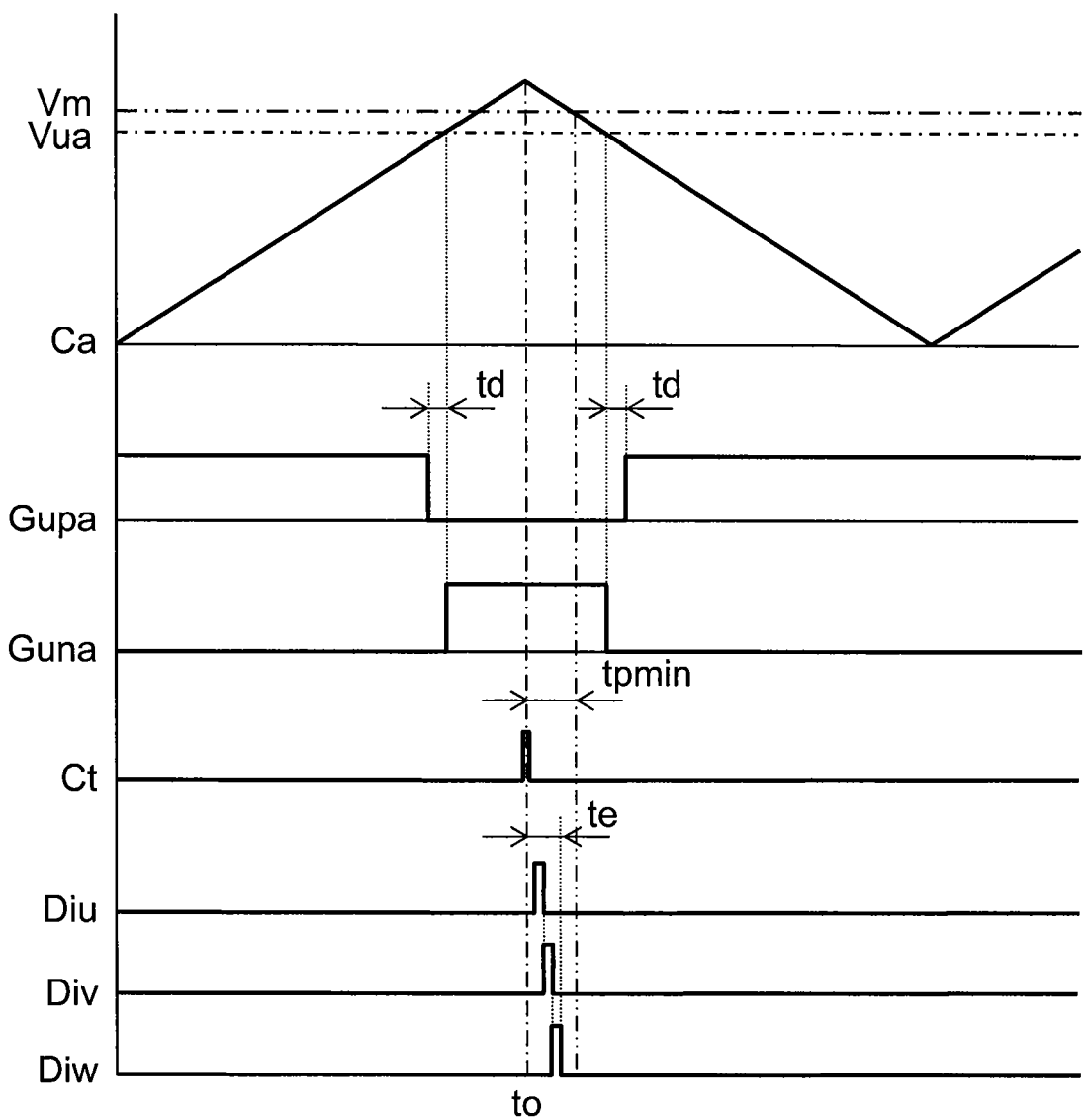
FIG. 10 is a timing chart of current detection in the motor-driving apparatus.

FIG. 9 is a block diagram of an A/D converter in accordance with the second exemplary embodiment of the present invention. FIG. 10 shows operation waveforms of the A/D converter. Including other parts (not shown in here), the configuration constitutes a heat-pump type washing and drying machine, as is in the case of the first embodiment.

In FIG. 9, Receiving input selection signal Cs, multiplexer 800E selects phase current signals Iu, Iv and Iw of one motor according to signal Cs. For example, when first motor 4A is selected, A/D converter 850A converts the phase current signals Iu, Iv and Iw of motor 4A into digital output Dia.

Second motor 4B and third motor 4C have a configuration the same as above; the conversion is separately carried out by motor in A/D converters 850B and 850C.

In FIG. 10, triangular carrier-wave Ca with a frequency of 16 kHz has a peak at time t0. At this time, overflow pulse signal Ct is produced by an interrupt signal. All of motors 4A, 4B and 4C shares value Vm. During the high-period of signal Guna shown in FIG. 10, the lower-arm switching devices are kept ON.

Like in the first embodiment, second motor 4B has a carrier frequency of 4 kHz. Signal Ct generates once every four peaks of signal Ca, not every peaks.

Third motor 4C, also like in the first embodiment, adopts a relatively high frequency of 16 kHz, suppressing vibration noise that can come from inappropriate setting of a carrier frequency.

In period Te, three-phase current signals Iu, Iv and Iw of first motor 4A are A/D converted into signal Dia one after another. As for motor 4B and motor 4C, as is the same above, A/D converters 850B and 850C carry out A/D conversion for signals in the order of U-phase, V-phase and W-phase, and output signals Dib and Dic.

Although carrier wave Cb (not shown in FIG. 10) is equal to carrier wave Ca in height of 255, the inclination of the triangular waveform is gradual. Therefore, when value Vm is used for all the motors, the ON-period of the lower-arm switching devices expands by four times from the center of the moment at which signal Ct is set-up. This reduces power switching noise interference to A/D conversion of the motor current in second inverter circuit 3B.

In a case where there is a perceptible time until the generation of signal Ct since carrier wave Ca has reached value Vm, even dead time Td and the action-delay time of each switching device are taken into account, the starting time of A/D conversion can be set earlier than the time at which carrier wave Ca has a peak. For example, the starting timing can be determined as follows: an interrupt signal is generated at the time of signal generation for the last-turned-ON switching device in the nine lower-arm switching devices of inverter circuits 3A, 3B and 3C; waiting for a predetermined time-delay to avoid switching noise interference, A/D conversion starts. This is effective in a case where a lack of time for A/D conversion occurs.

Although the configuration of the second embodiment includes three A/D converters, like in the first embodiment, it is not limited thereto; a similar effect is obtained by a configuration having a single A/D converter and a multiplexer. In this case, with the use of the multiplexer, the A/D converter serves as a plurality of A/D converters each of which detects a current value of each motor.

Besides, in the configuration of the second embodiment, position detector 40A is performed on first motor 4A only. The advantage of the configuration is that d-q coordinate transformation in the vector control is carried out with accuracy even when the condition of clothes in rotation drum 5 varies. This is also effective in reducing noise interference and vibration. However, the configuration is not limited thereto; the vector control without a position detector is also applicable. In addition, the reactive current constant control can be adopted for first motor 4A, as in the case of motors 4B and 4C.

The reactive current constant control, which is adopted for second motor 4B and third motor 4C, provides rotating speed with stability, eliminating vibration noise. However, the control by detection of a reactive current value is not an absolute necessity for motor 4B and motor 4C; the vector control or the sinusoidal-wave control with a position detector can be used for them.

In the cases above, too, the control by single processor 82 provides a stable sinusoidal-wave driving, preventing switching noise interference of the motors.

Third Embodiment

Figure 11:
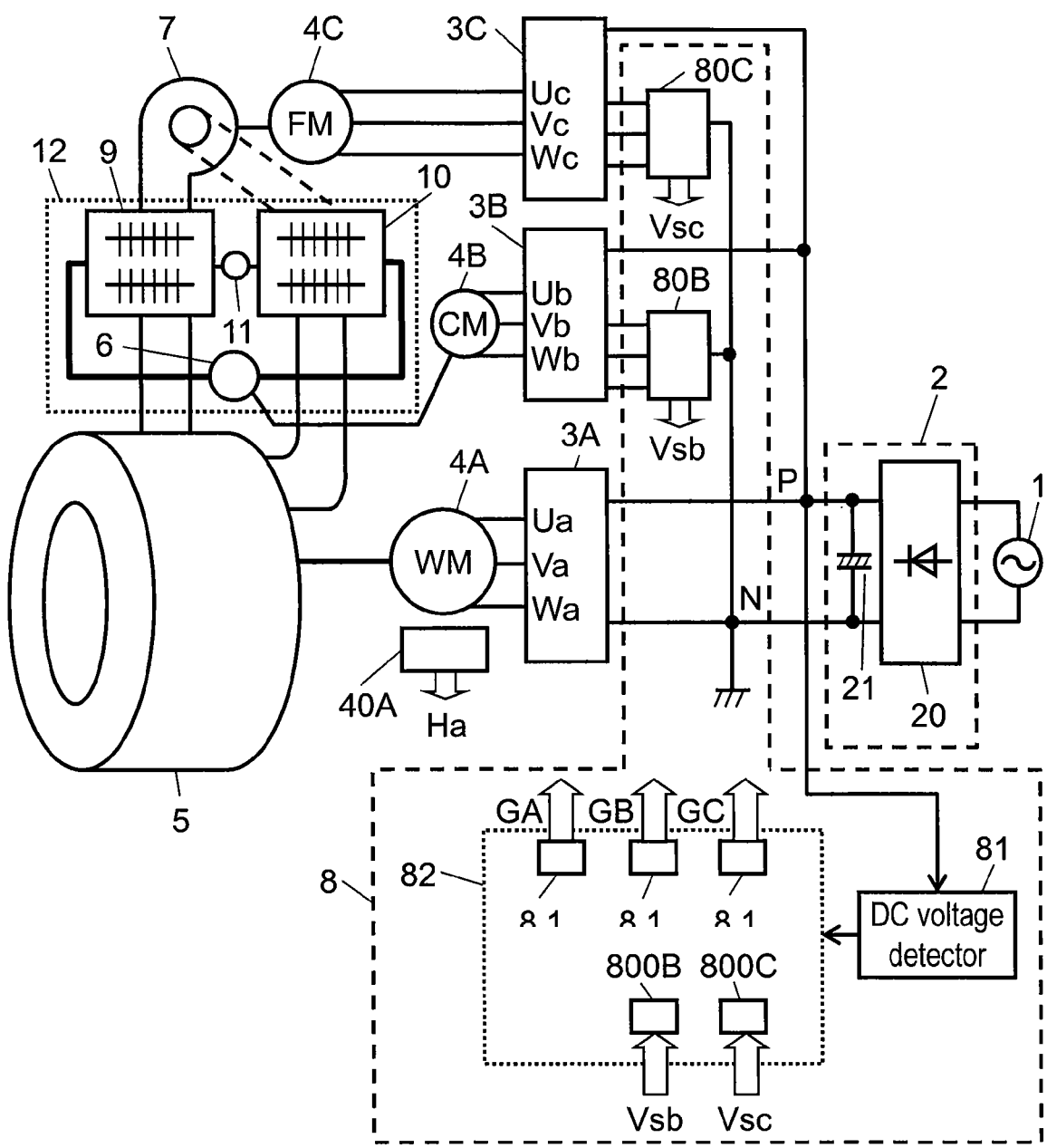
FIG. 11 is a block diagram of a motor-driving apparatus in accordance with a third exemplary embodiment of the present invention.

FIG. 11 is a block diagram of a washing and drying machine of the third exemplary embodiment. The configuration of the embodiment is similar to that of the first embodiment (FIG. 1) with the exception that first current detector 80A and A/D converter 800A for detecting current signal Vsa of first motor 4A are removed.

According to the third embodiment, rotation drum-driving motor 4A does not adopt the vector control or the reactive current constant control. Instead, motor 4A operates on the sinusoidal-wave driving through the following way: obtaining the rotor position and actual speed from a position detecting signal fed from position detector 40A; determining the phase and amount of voltage Va applied to motor 4A by set speed, the amount of clothes, with reference to a table; and controlling PWM controller 810A so that voltage with a sinusoidal waveform is applied to motor 4A. Through the control above, the configuration offers current with a substantially sinusoidal waveform.

In terms of fluctuation in load, the configuration of the embodiment suffers fluctuation in phase and amount of motor current, and torque; however, the simple configuration without first current detector 80A and first A/D converter 800A can reduce vibration and vibration noise to a satisfactory level in the practical use.

To protect the over-current of the switching device in first inverter circuit 3A, a resistor should be connected between rectifying circuit 2 and the common emitter node of the three lower-arm switching devices.

As described in the first through the third embodiments, the sinusoidal-wave driving of a plurality of motors (three motors are adopted here) by single processor 82 provides an integrated timing control. With the configuration having reduced number of components, stable driving control can be obtained. As for an advantage in the timing control, the configuration provides the switching devices of each inverter circuit with reliable ON/OFF timing. Besides, the configuration controls current detection and A/D conversion so as not to take place in the switching period of the switching devices, whereby interference of power switching noise is completely eliminated. As a result, the sinusoidal-wave driving contributes to a noise-reduced stable operation.

A power switching noise source—other than the interaction of the inverter circuits—can be found in the following cases. When the configuration includes a switching-type power-supply circuit for supplying power supply voltage of 5V to processor 82A, or rectifying circuit 2 includes a booster circuit, the ON/OFF operations of the switching devices can cause noise interference. In this case, too, power switching noise is reduced by controlling the switching operations so as not to occur in and around the period of A/D conversion.

Although the configuration described in the first through the third embodiments adopts three-shunts current detection—the configuration includes three resistors, each of which is connected to each emitter of three lower-arm switching devices (transistor), it is not limited thereto; single-shunt current detection is also effective. In this case, one resister is connected between the negative terminal of rectifying circuit 2 and the common emitter terminal of the three lower-arm switching devices. The voltage of the resistor is A/D-converted in synchronization with switching timing. In the configuration, it becomes difficult to control the switching timing, compared to the three-shunts current detection adopted in the embodiments, due to constraint on the period for A/D conversion, which can cause interference. In this case, by adopting a configuration with a single processor capable of controlling the PWM controllers of the inverter circuits for driving the motors so as to have a synchronized operation; furthermore, by controlling the A/D converters to have well-timed A/D conversion, undesired effect of switching noise interference is minimized.

As for other configurations for a current detector, using a DCCT is a possibility. When a three-phase motor is adopted, the DCCT is used for the two lines out of the three lines of the motor. Using a Hall element and an amplifier, the DCCT detects current directly from a DC component (i.e., with a frequency of zero).

The current detection by a DCCT differs from the detection in the aforementioned embodiments in that analog output signal voltage is accurately detected regardless of whether the lower-arm switching devices are kept ON or not. That is, a DCCT theoretically eliminates the necessity for controlling the timing of A/D conversion; in practice, the adverse effect of power switching noise generated by interaction of the inverter circuits is unavoidable as long as the configuration has a plurality of inverter circuits. The configuration of the present invention, in which the switching operations are controlled by a single processor, is highly effective in minimizing switching noise interference.

Although the configuration described in the embodiments adopts triangular carrier waveform, it is not limited thereto; sawtooth waveform can be used.

When a sawtooth wave is adopted for the PWM controller that operates the sinusoidal-wave driving, the switching operations can simultaneously take place. In addition, undesired harmonics component can increase, compared to the driving control with the use of triangular carrier waves. However, in terms of basic operations (i.e., a predetermined voltage is applied to each phase of the motors), it works exactly alike, besides, the configuration can be simplified. In this case, too, by adopting a configuration with a single processor capable of controlling the PWM controllers of the inverter circuits for driving the motors so as to have a synchronized operation; furthermore, by controlling the A/D converters to have well-timed A/D conversion, a stable sinusoidal-wave driving of the motors, with undesired effect of switching noise interference minimized.

In the sinusoidal-wave driving, the current exhibits a near-sinusoidal wave; in reality, the sinusoidal shape is often distorted by superimposed carrier frequency components; distortion of induced electromotive force; nonlinearity of magnetic characteristics of a motor. In some cases, to cancel out torque ripple or cogging torque, a distortion is intentionally added to the waveform of current applied to a motor. Therefore, a waveform—in spite of including a harmonics component, as long as having substantially sinusoidal shape—is regarded as being sinusoidal.

Although the embodiments introduces the configuration that adopts three-phase motors each of which is fed AC power from a full-wave six-transistor-mounted inverter circuit, a combination of the number of phases and the number of transistors is not limited thereto. In addition, an insulated-gate bipolar transistor (IGBT), a bipolar-type element, and a metal-oxided-semiconductor field-effect transistor (MOSFET) can be a switching device. In all the cases above, the driving control by a single processor allows the switching devices of each inverter circuit to have proper ON/OFF timing, providing sinusoidal-wave driving with stability. As a result, a vibration noise- and vibration-suppressed washing/drying machine is obtained.

The motor-driving apparatus of the washing and drying machine of the present invention, as described above, adopts a single processor and controls the three motors so as to have synchronized operations on sinusoidal-wave driving.

What is claimed is:

1. A motor-driving apparatus of a washing and drying machine comprising:
    a rectifying circuit for converting AC (alternating current) power of AC power supply into DC (direct current) power;
    a plurality of inverter circuits for converting the DC power from the rectifying circuit into AC power;
    a first motor for driving a rotation drum;
    a second motor for driving a compressor of a heat pump;
    a third motor for driving a blow fan that sends air to a heat exchanger of the heat pump; and
    a controller that controls the inverter circuits by a single processor,
    wherein, the first motor through the third motors are simultaneously driven by sinusoidal-wave control of each of the inverter circuits.

2. The motor-driving apparatus of a washing and drying machine of claim 1, wherein the controller simultaneously provides the second motor and the third motor with sensorless sinusoidal-wave drive.

3. The motor-driving apparatus of a washing and drying machine of claim 1 further includes a plurality of current detectors for detecting a motor current of the first motor, the second motor and the third motor, and the controller has a configuration in which the single processor controls the plurality of current detectors so as to detect a plurality of motor currents.

4. The motor-driving apparatus of a washing and drying machine of claim 3, wherein the single processor of the controller includes a plurality of A/D converters for converting analog signals of the plurality of motor currents detected by the plurality of current detectors into digital signals.

5. The motor-driving apparatus of a washing and drying machine of claim 3, wherein the single processor of the controller includes i) a plurality of PWM controllers for controlling the plurality of inverter circuits; and ii) a plurality of A/D converters for converting analog signals of the plurality of motor currents detected by the plurality of current detectors into digital signals.

6. The motor-driving apparatus of a washing and drying machine of claim 5, wherein the plurality of A/D converters operate A/D conversion in synchronization with the plurality of PWM controllers.

7. The motor-driving apparatus of a washing and drying machine of claim 1 further includes a plurality of current detectors for detecting a motor current of the second motor and the third motor, and the controller has a configuration in which the single processor controls the plurality of current detectors so as to detect a plurality of motor currents.

8. The motor-driving apparatus of a washing and drying machine of claim 7, wherein the single processor of the controller includes a plurality of A/D converters for converting analog signals of the plurality of motor currents detected by the plurality of current detectors into digital signals.

9. The motor-driving apparatus of a washing and drying machine of claim 7, wherein the single processor of the controller includes i) a plurality of PWM controllers for controlling the plurality of inverter circuits; and ii) a plurality of A/D converters for converting analog signals of the plurality of motor currents detected by the plurality of current detectors into digital signals.

10. The motor-driving apparatus of a washing and drying machine of claim 9, wherein the plurality of A/D converters operate A/D conversion in synchronization with the plurality of PWM controllers.

* * * * *

UNITED STATES PATENT AND TRADEMARK OFFICE
CERTIFICATE OF CORRECTION

PATENT NO.         : 7,504,784 B2                                               Page 1 of 1
APPLICATION NO. : 11/616487
DATED              : March 17, 2009
INVENTOR(S)        : Kazuhiko Asada et al.

It is certified that error appears in the above-identified patent and that said Letters Patent is hereby corrected as shown below:

On the Title Page, FIELD [75], INVENTORS: "Hisachi Hagiwara" should read --Hisashi Hagiwara--

Signed and Sealed this

Sixteenth Day of June, 2009

JOHN DOLL
*Acting Director of the United States Patent and Trademark Office*